(12) United States Patent
Carpenter et al.

(10) Patent No.: US 7,048,083 B1
(45) Date of Patent: May 23, 2006

(54) MOTORCYCLE INCLUDING A UNIQUE FRAME AND DRIVE UNIT

(75) Inventors: Mark R. Carpenter, Iowa Falls, IA (US); Jess D. Lindsay, Iowa Falls, IA (US)

(73) Assignee: Paradigm Technologies, L.L.P., Iowa Falls, IA (US)

( * ) Notice: Subject to any disclaimer, the term of this patent is extended or adjusted under 35 U.S.C. 154(b) by 164 days.

(21) Appl. No.: 10/194,757

(22) Filed: Jul. 12, 2002

(51) Int. Cl.
*B62D 61/02* (2006.01)
(52) U.S. Cl. ........................ 180/219; 180/305; 362/476
(58) Field of Classification Search ................ 180/219, 180/305, 307, 308, 227; 362/473, 475, 476
See application file for complete search history.

(56) References Cited

U.S. PATENT DOCUMENTS

| | | | | |
|---|---|---|---|---|
| 1,510,937 | A | * | 10/1924 | Harley ........................ 180/219 |
| 2,168,939 | A | * | 8/1939 | Kraeft ........................ 74/551.8 |
| 2,539,490 | A | * | 1/1951 | Smith ......................... 180/308 |
| 4,139,072 | A | * | 2/1979 | Dawson ....................... 180/312 |
| 4,165,728 | A | * | 8/1979 | Matsumoto et al. ..... 123/182.1 |
| 4,560,020 | A | * | 12/1985 | Mambelli ................... 180/53.1 |
| 5,042,608 | A | * | 8/1991 | Horiike et al. .............. 180/219 |
| 5,054,572 | A | | 10/1991 | Parker |
| 5,857,538 | A | * | 1/1999 | Chambers ................... 180/219 |
| 6,105,701 | A | | 8/2000 | Buell |
| 6,238,017 | B1 | | 5/2001 | Eitel |
| 6,378,644 | B1 | | 4/2002 | Brown et al. |
| 6,398,393 | B1 | * | 6/2002 | Perse .......................... 362/473 |
| 6,405,821 | B1 | | 6/2002 | Tsutsumikoshi |
| 6,516,910 | B1 | * | 2/2003 | Buell et al. .................. 180/219 |
| 6,592,242 | B1 | * | 7/2003 | Scaccia ....................... 362/473 |

FOREIGN PATENT DOCUMENTS

| | | | |
|---|---|---|---|
| GB | 2179603 | * | 3/1987 |
| JP | 57-107458 | * | 7/1982 |
| JP | 1-273781 | * | 11/1989 |
| JP | 4-27682 | * | 1/1992 |
| JP | 5-162680 | * | 6/1993 |

OTHER PUBLICATIONS

"Hot Bike," vol. 33, No. 6, Jun. 2001.
"Hot Bike," vol. 34, No. 4 Apr. 2002.

* cited by examiner

*Primary Examiner*—Anne Marie Boehler
(74) *Attorney, Agent, or Firm*—McKee, Voorhees & Sease, P.L.C.

(57) ABSTRACT

A motorcycle including a frame having a backbone and engine carrier prevents the need for front support bars. The power plant is secured to the backbone and engine carrier and may be quickly removed. The power plant turns a hydraulic pump that transfers power to a hydraulic motor via hydraulic fluid. A reservoir of hydraulic fluid is preferably contained in the backbone. The hydraulic motor is contained in a swing arm and connects to one side of the rear wheel. The hydraulic motor acts as both a drive unit and a braking unit. Lights may be secured to the engine carrier to provide a better view of the road.

20 Claims, 9 Drawing Sheets

MOTORCYCLE INCLUDING A UNIQUE FRAME AND DRIVE UNIT

BACKGROUND OF THE INVENTION

The present invention relates generally to a motorcycle and more specifically, but without limitation, to a motorcycle having a new frame assembly and drive unit. In the past, motorcycles have typically incorporated a traditional gear drive assembly that is powered by a gasoline engine. The gasoline engine, typically having a plurality of cylinders arranged in a V formation is supported and secured to the motorcycle by a pair of bracing members extending down from the handlebar region. These supports are both unsightly and heavy. However, they have been necessary in the past to prevent flexing in the frame. It is therefore desirable to provide a motorcycle that eliminates or greatly reduces the reliance on any front bracing members.

Further, because the front bracing members were an integral portion of the motorcycle frame and were required to support the engine, a larger engine would necessitate a larger frame. This affects the positioning of the rider and limits the ability of smaller riders to comfortably operate such motorcycles. It would be preferable to have a motorcycle capable of accepting a wide variety of engine sizes and models without affecting the rider's position and thereby ability to operate the motorcycle.

Motorcycle riders also require special training to operate and maintain the current clutch and chain style transmissions. Special courses are available to teach novice riders how to properly shift their motorcycle's transmission. Moreover, current transmissions on motorcycles use chain drives that can break down and cause significant damage. It is therefore desirable to have a motorcycle that includes a drive unit that is easy to operate and maintain.

Further, current clutch and chain transmissions require separate brakes be installed. Installing brakes on the rear wheel of current motorcycles prevents rapid removal of the rear wheel. Rapid removal is desirable when flat tires or other wheel problems occur. There is therefore a need for a drive unit that includes a braking system that allows for quick removal of the rear wheels.

Today, hydraulic drive units have been used primarily on small driving equipment such as lawnmowers or other such lawn equipment. Hydraulic drive units usually run very high torque outputs, and therefore are ideal for applications of low speeds. Hydraulic drive units incorporate a braking system and eliminate the need for a clutch or chain drive style transmission. It would therefore be desirable to adapt a hydraulic drive unit for a high speed application.

Previous attempts to incorporate hydraulic drive units in high speed applications have failed. The failure resulted from a build-up of high pressures in the hydraulic lines created during braking. The build-up caused seals to burst and thus limited any real-world applications. It would be desirable to provide a motorcycle that overcomes the problems created during braking.

There is therefore a need to provide a motorcycle which solves these and other problems in the art.

FEATURES OF THE INVENTION

A general feature of the present invention is the provision of a motorcycle which overcomes the problems found in the prior art.

Another feature of the present invention is the provision of a motorcycle that is aesthetically appealing.

A still further feature of the present invention is the provision of a motorcycle that supports the engine without the need for additional front supports.

Yet another feature of the present invention is the provision of a motorcycle that is easy to operate and maintain.

Another feature of the present invention is the provision of a motorcycle that is easy to ride no matter the size of rider.

A further feature of the present invention is the provision of a motorcycle that includes a drive train that incorporates a braking system.

A still further feature of the present invention is the provision of a motorcycle that includes a drive unit that allows for easy removal of the rear wheel.

Another feature of the present invention is the provision of a motorcycle that includes a hydraulic drive unit.

BRIEF SUMMARY OF THE INVENTION

In accordance with the present invention, a motorcycle generally includes a hydraulic drive unit that is driven by a power plant, such as a gasoline engine. The hydraulic drive unit is preferably attached to the rear of the motorcycle frame and to one side of the rear wheel. The hydraulic drive unit generally includes a hydraulic reservoir that supplies fluid to a hydraulic pump and motor. The flow of the hydraulic fluid can be controlled by a valve to allow the motorcycle to operate in either forward or reverse.

The hydraulic pump is powered by the power plant of the motorcycle. The hydraulic pump pressurizes the fluid and transfers it via hydraulic lines to a motor including a gear case that steps up the speed of the generally low-speed hydraulic pump. Slowing down or stopping the flow of hydraulic fluid will cause the gearing system to slow down, thus using the motor as a braking system. The use of the hydraulic drive unit of the present invention provides both power and braking to the rear wheel, thereby alleviating the need for a supplemental braking system such as the currently employed brake pads and shoes.

Moreover, in accordance with the present invention, the power plant and hydraulic drive unit are supported by a spine-like frame without the need for additional front support braces. The spine-like frame of the present invention generally includes a tube of metal that is preferably reinforced with a strip a steel or other high-strength material, such as carbon fiber, kevlar, etc. The power plant and hydraulic pump are secured to an engine carrier that is secured to the spine, thereby simplifying removal of the power plant and hydraulic pump. The power plant thus becomes a structural member that is secured without the need for additional braces that extend up into the handlebar or neck region of the motorcycle. The frame and engine carrier may be made of any strong material such as aluminum, titanium, high-carbon steel, or any ferrous or non-ferrous material.

Further, the frame of the present invention can operate as a fluid reservoir for the hydraulic fluid. By returning hydraulic fluid to the top of the reservoir in the spine-like frame and running it down the frame, the fluid can be cooled, thus eliminating the need for additional radiator style cooling of the hydraulic system. This return system also allows for any excess pressure built up on the fluid during braking to be released into the frame, thereby preventing a blowout of the hydraulic lines or seals. Alternatively, the present invention can use a hydrostatic drive unit or the clutch and chain style drive units that exist in the market today.

The present invention may also incorporate a new lighting system. Lights are typically attached to the neck or handlebar portion of a motorcycle. However, this prevents the user from seeing low objects directly in front of the motorcycle, such as manholes, rocks, glass, cracks in the road, potholes, etc. By placing one or more lights on the engine carrier, these objects or obstructions may be more easily seen.

DETAILED DESCRIPTION OF THE INVENTION

The present invention will be described as it applies to its preferred embodiment. It is not intended that the present invention be limited to the described embodiment. It is intended that the invention cover all modifications and alternatives which may be included within the spirit and scope of the invention.

Figure 1:
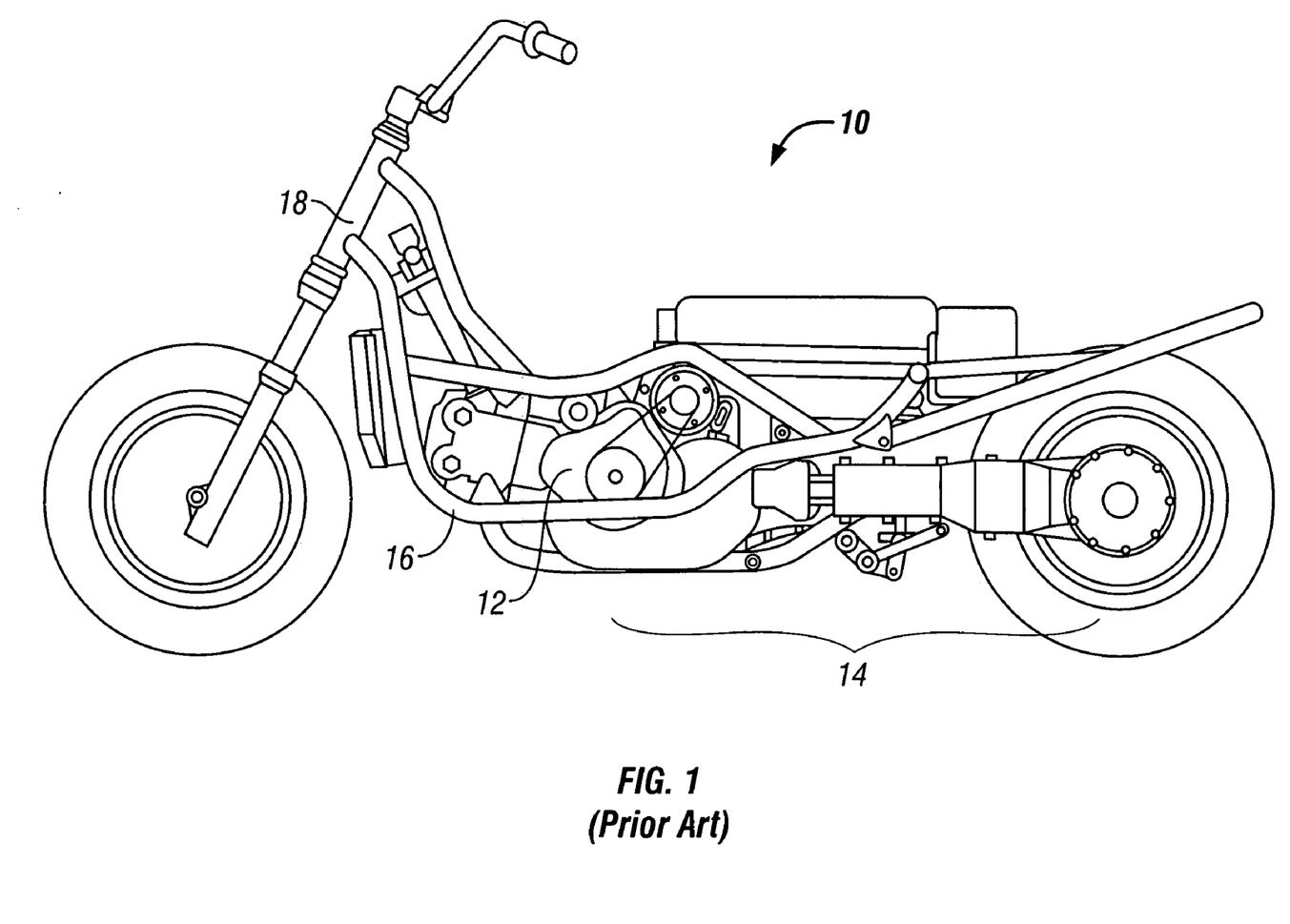
FIG. 1 is a side view of a motorcycle of the prior art.

A standard motorcycle 10 commonly seen on the road today is shown in FIG. 1. As can be seen, the motorcycle 10 of current designs uses a gasoline engine 12 connected to a clutch and chain drive unit 14. The engine 12 is supported by a pair of down tubes or supporting braces 16 secured to the neck 18 of the motorcycle 10.

Figure 2:
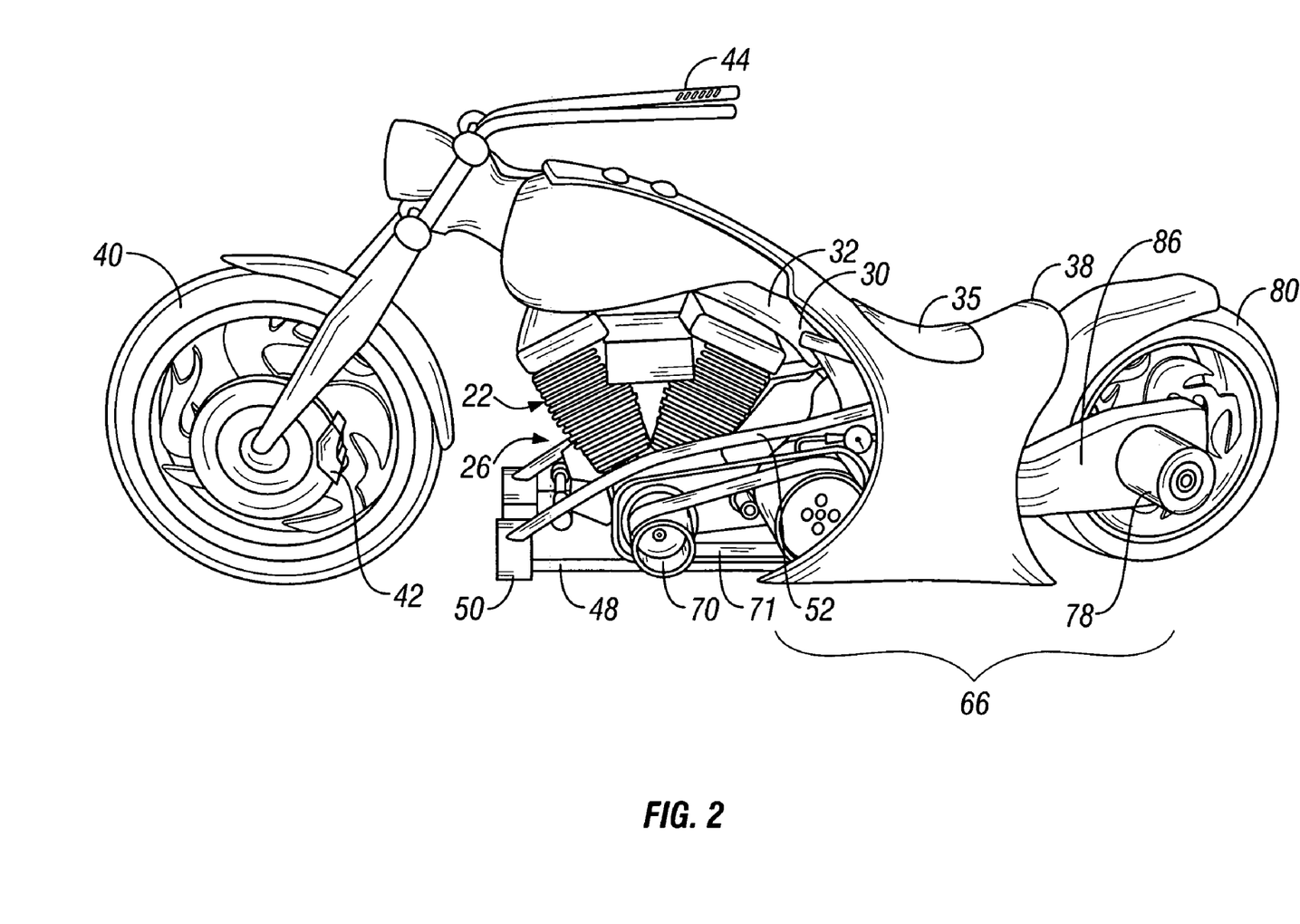
FIG. 2 is a side view of one embodiment of the motorcycle of the present invention.
Figure 3:
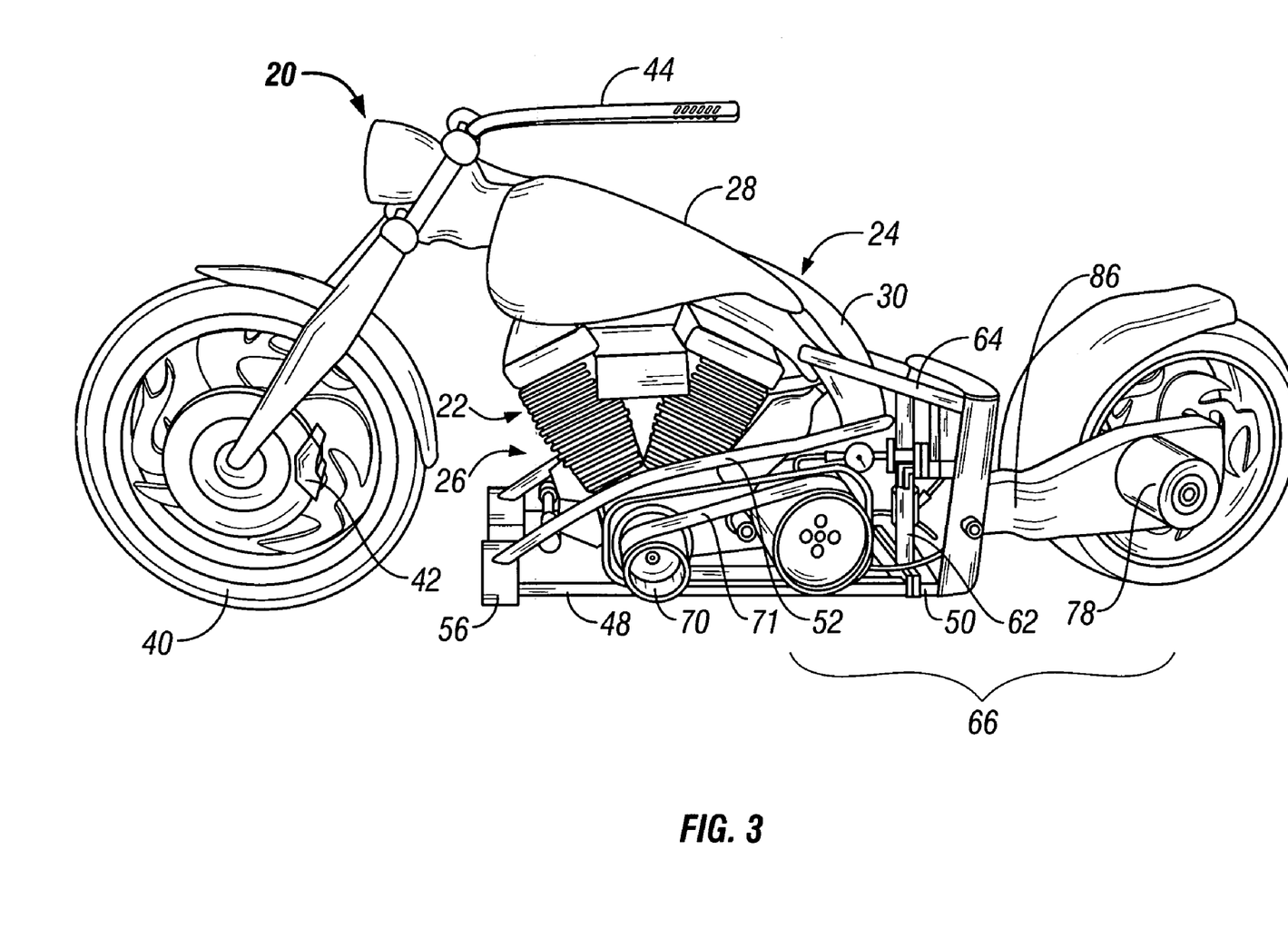
FIG. 3 is a side view of the motorcycle of FIG. 2 with the seat and housing removed.
Figure 4:
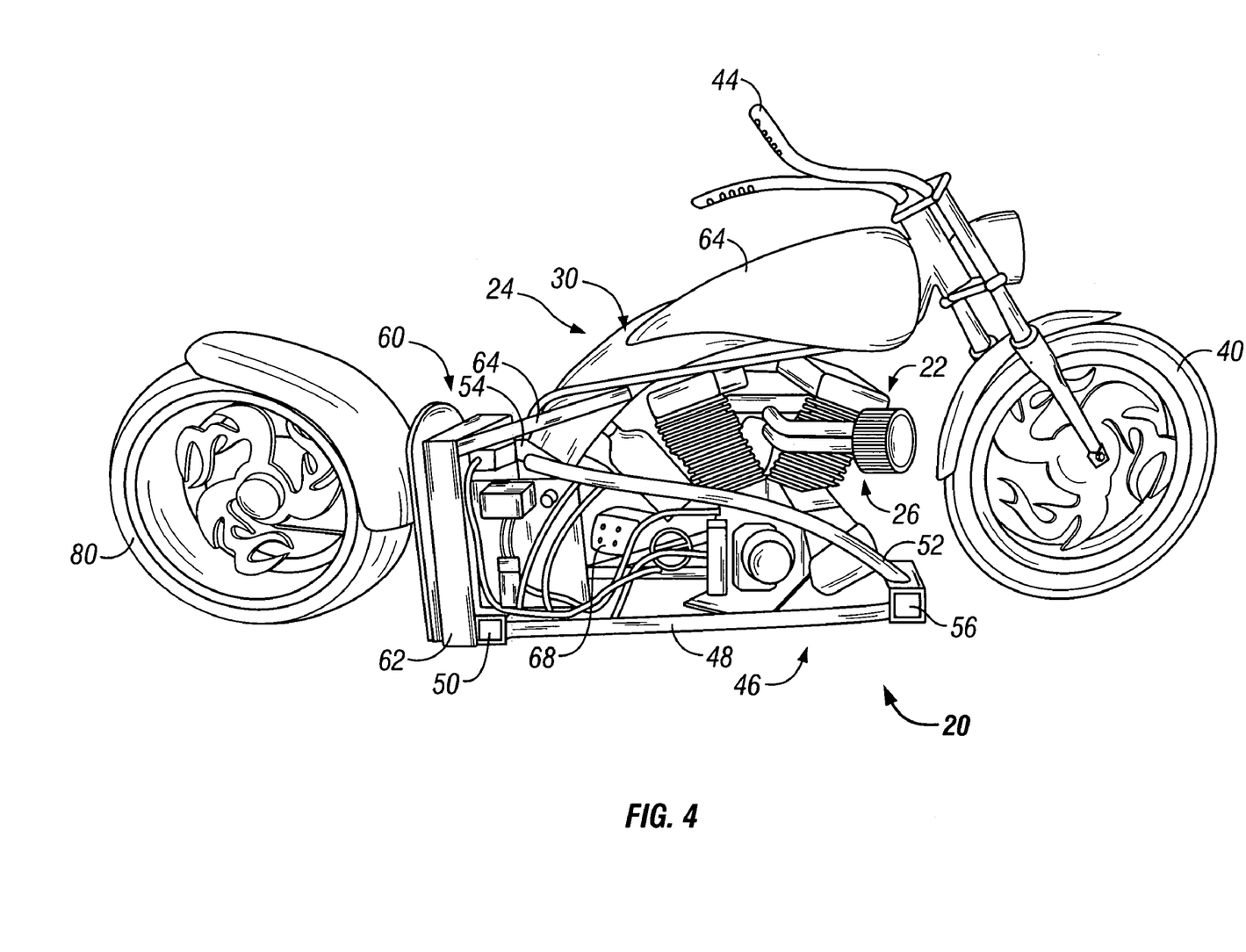
FIG. 4 is a side view of the opposite side of the motorcycle shown in FIG. 3.
Figure 5:
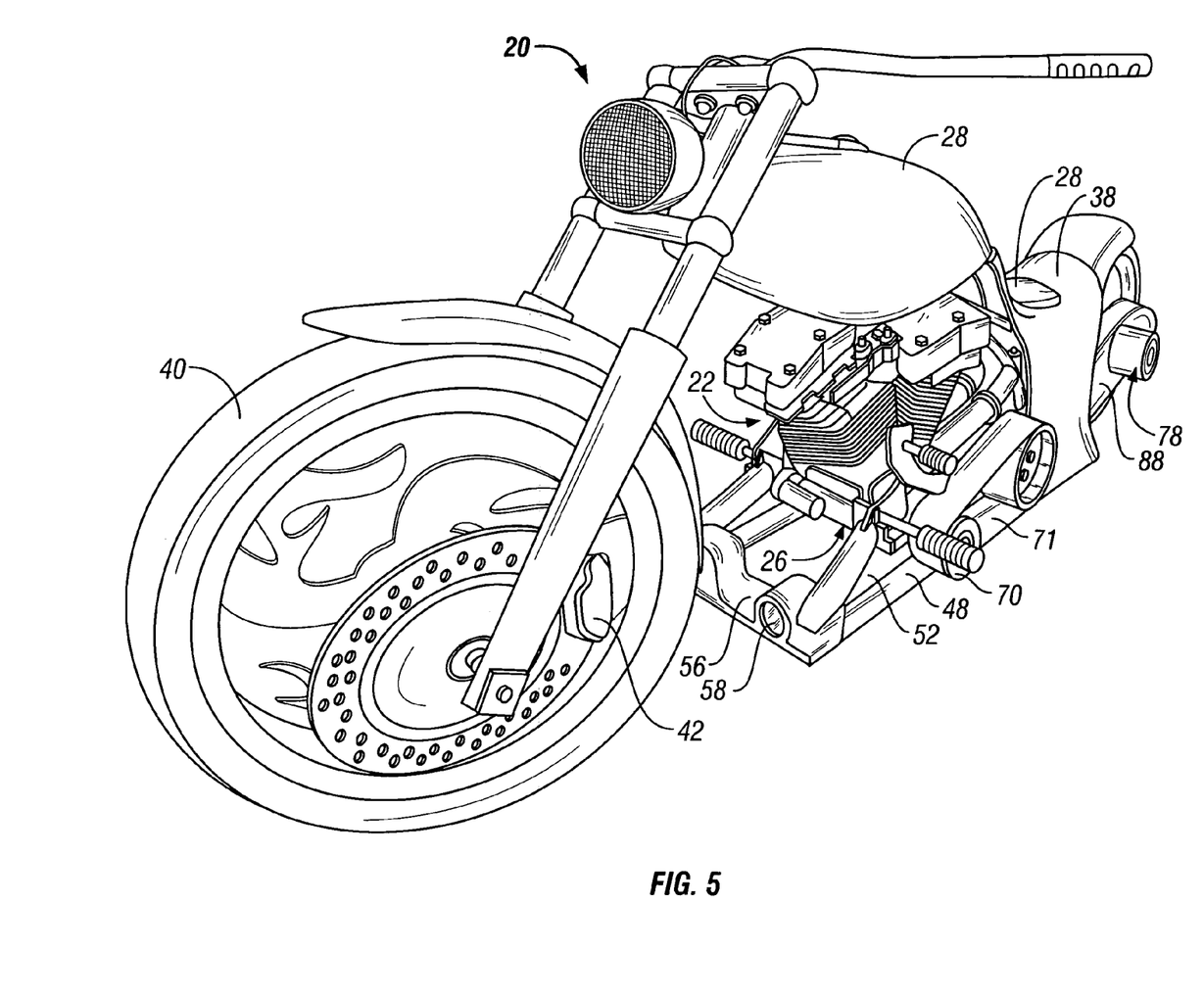
FIG. 5 is a front vew of the motorcycle of FIGS. 3 and 4.

The present invention is generally shown in FIG. 2. A rider will sit in the seat 35 secured to a removable covering 38. As shown in FIGS. 3–5, the covering 38 and seat 35 have been removed to show the arrangement of the frame 24 and the engine carrier 26. The motorcycle 20 of the present invention generally includes a power plant 22 and fuel tank 28 secured to a frame 24.

Many of the prior motorcycle frames included supporting braces 16 as shown in FIG. 1. The present invention eliminates the need for the supporting braces 16 by employing a new and unique frame 24. The frame 24 can be built out of many materials, including, but not limited to aluminum, titanium, high carbon steel, or any other strong ferrous or non-ferrous material. Generally, the frame 24 of the present invention includes a backbone 30 having an upper portion 32 and lower portion 34. The backbone 30 is durable enough to resist torsional forces applied to the frame 24. The backbone 30 of the present invention is preferably constructed from 2"x5" steel tubing. Any cross-sectional shape may be employed so long as the resulting backbone 30 has the required strength to resist torsional forces normally encountered during operation of motorcycle 20.

While the backbone 30 of the present invention may be made of any desired thickness of material, it is desirable to minimize the overall weight of the motorcycle 20. Therefore, while a thick piece of steel may be suitable for resisting torsional forces, it is preferable to use hollow tubing that is reinforced. Reinforcing the backbone 30 of the present invention involves pre-stressing the backbone 30 by heating it. Then a strip 36 of quarter-inch steel is welded to the top side of the backbone 30 to keep it from flexing. The strip 36 can be applied over the entire length of the backbone 30 or as desired. By welding the reinforcement strip 36 to the backbone 30 while the backbone 30 is hot, the overall rigidity of the backbone 30 can be increased. This saves on weight and lowers the overall cost of the motorcycle 20.

The upper portion of the backbone 30 is secured to the neck of the motorcycle 20. A headlight is operatively connected to the neck of the motorcycle 20 to pivot with the front wheel 40. The front wheel 40 employs a braking system 42 as conventionally known in the art. The handlebars 44 allow the rider to steer the motorcycle 20 of the present invention in a conventional manner. However, because of the unique drive unit of the present invention, the design of the handlebars 44 need not include many of the controls of a conventional motorcycle.

The upper portion 32 of the backbone 30 also supports a fuel tank 28 for the gasoline engine or power plant 22. The lower side of the upper portion 32 of the backbone 30 is secured to the power plant 22 which becomes a structural member of the motorcycle 20. The power plant 22 can be of any type and is preferably a Harley Davidson eighty-eight cubic inch gasoline engine.

Figure 9:
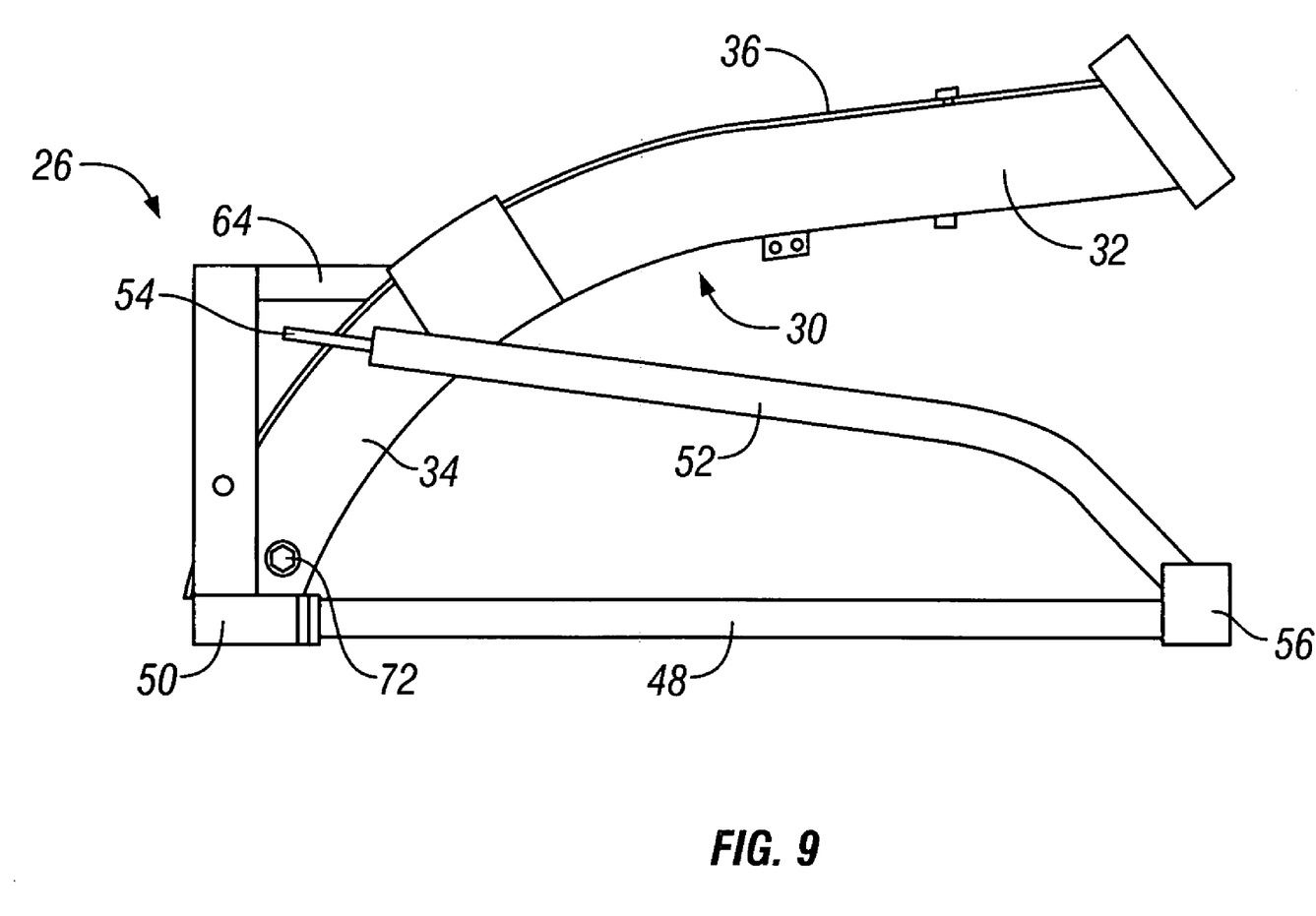
FIG. 9 is a side view of one embodiment of the frame of the present invention.

As shown in FIG. 9, an engine carrier 26 includes one or more engine mounts 48 to which the power plant 22 is secured. The engine mounts 48 are connected to a rear base plate 50 that is connected to the lower portion 34 of the backbone 30. While the engine carrier may be constructed of the same material used to build the rest of the frame, an aluminum or titanium alloy material may be preferable. The engine carrier 26 also includes one or more upper supports 52. The upper supports 52 are secured to the backbone 30 away from the neck by one or more load transfer bars 54. The upper supports 52 and the engine mounts 48 are secured to the load transfer bars 54 and base plate 50, respectively, by welding, bolting, or using any other known method of connection. By bolting the engine carrier 26 to the rest of the frame 24, the engine carrier 26 can be quickly and easily removed for maintenance or engine replacement.

If a pair of engine mounts 48 and upper supports 52 are used as shown, they may be connected via a tie bar 56. The engine mounts 48 and upper supports 52 may be secured to the tie bar through any of the known connection means. The tie bar 56 may also be used to provide a mounting for supplemental or primary lights 58. The lights 58 may be connected to the electrical system of the motorcycle 20 in a conventional manner. By placing the lights 58 in a lower position on the motorcycle 20 as shown in FIG. 5, potholes, man hole covers, rocks and other low lying potential hazards may be illuminated to give the rider a better view of the road.

A suspension loading platform 60 is secured to the rear of the backbone 30. The suspension loading platform 60 generally includes a pair of vertically oriented suspension mounts 62. The rear suspension of the motorcycle may be of any know variety, including a pneumatic or hydraulic suspension that may be raised or lowered as desired. Here, the motorcycle 20 is shown in a lowered position. In the lowered position, the base plate 50 contacts the road, parking lot or floor thereby stabilizing the motorcycle 20 for parking. This eliminates the need for a kick stand normally required with previous motorcycles 10.

The suspension mounts 62 are preferably connected to the backbone 30 at their highest point by a pair of corresponding load transfer bars 64. The load transfer bars 64 apply forces resulting from the rear weight of the motorcycle 20 to the backbone 30 in an opposite direction to the loads generated by the engine carrier 26. The suspension mounts 62 preferably are adjustable for different types of service as well as traction enhancement.

In this manner, all of the loads from the suspension 64, engine carrier 26, fuel tank 28, and rider are carried on the backbone 30 of the frame 24 without the need for the additional front support bars used in motorcycles today. This allows the frame 24 to be built in almost any size or length. The length can be varied from around eight inches to nearly as long as the rider desires. Moreover, because the size of the motorcycle 20 is no longer controlled by the size of the power plant 22, the builder may customize the motorcycle 20 to fit any rider or any rider's desires.

Figure 6:
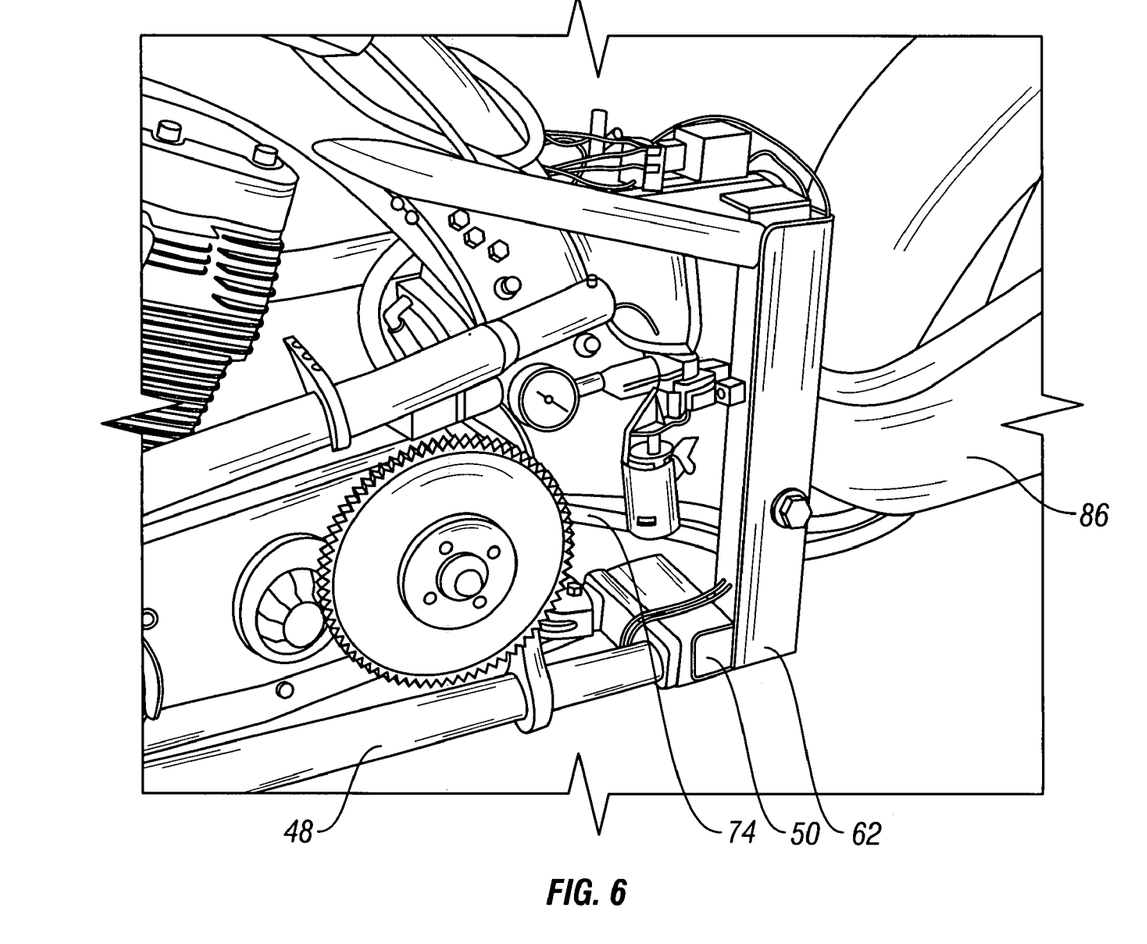
FIG. 6 is a close up side view of one embodiment of the front section of the drive unit of the present invention.
Figure 7:
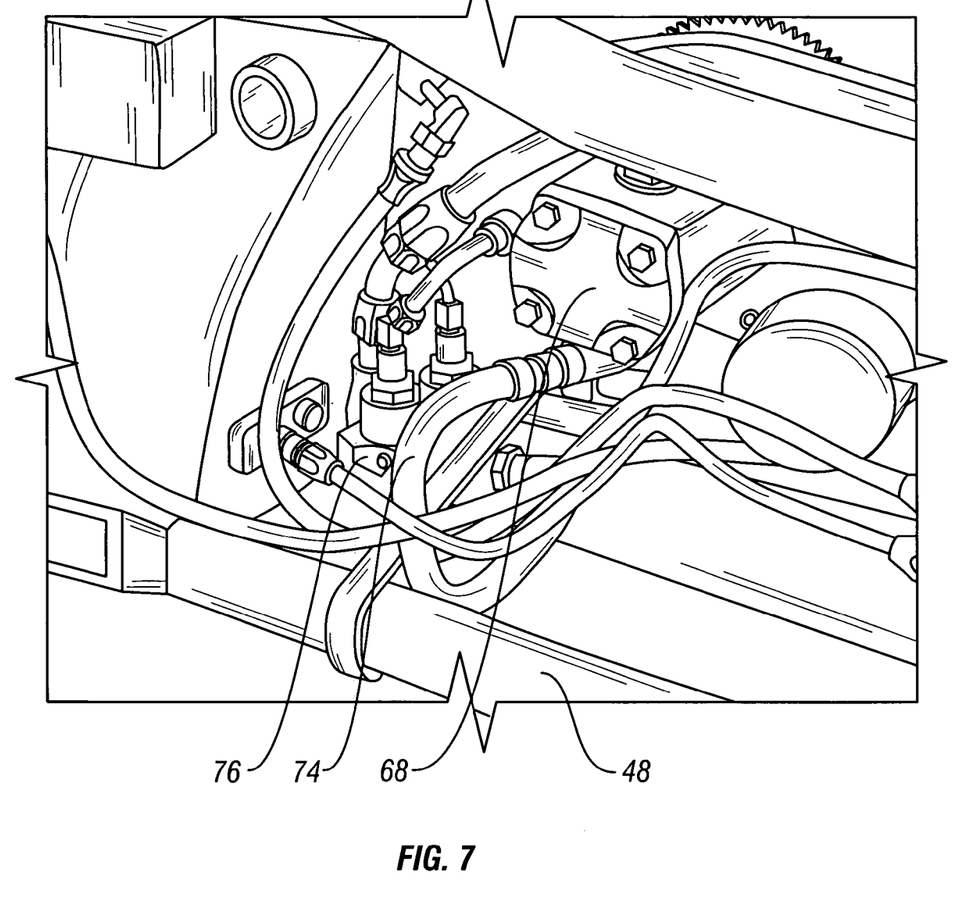
FIG. 7 is a close up side view of one embodiment of the hydraulic pump system of the present invention.
Figure 8:
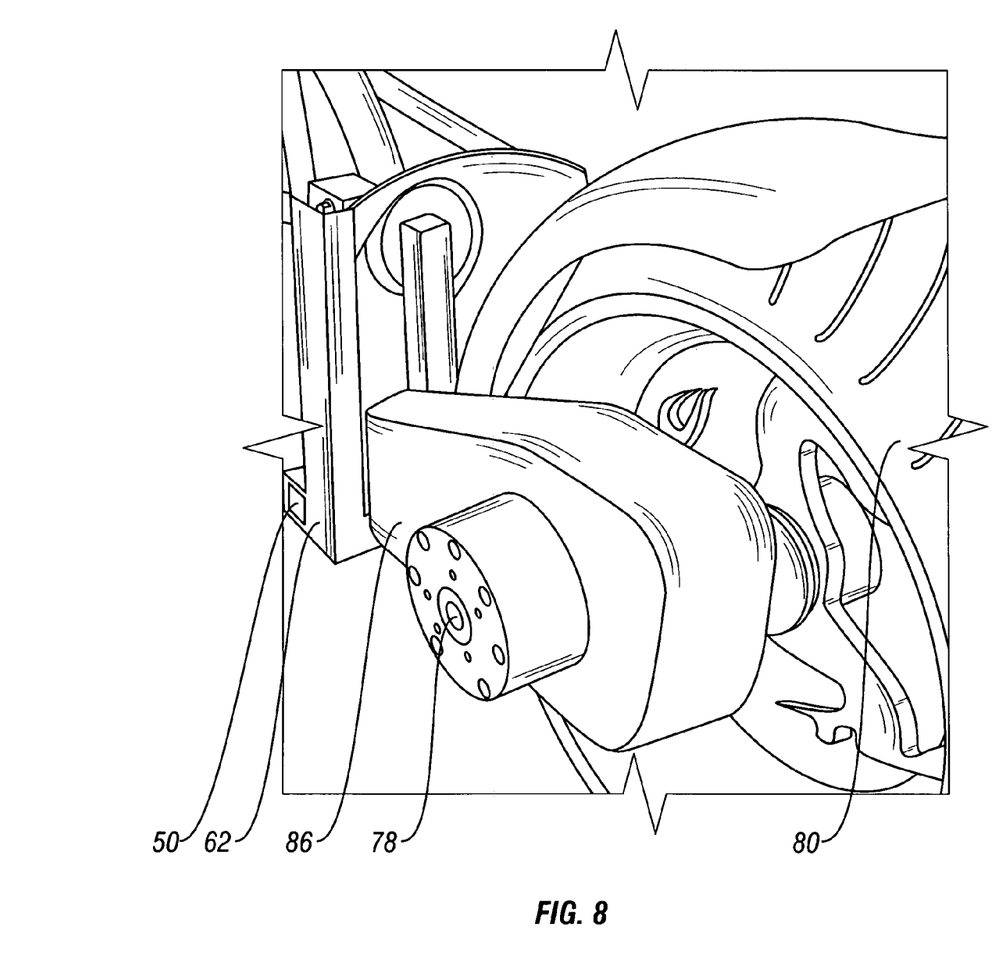
FIG. 8 is a close up side view of one embodiment of the rear section of the drive unit of the present invention.

The power plant 22 is secured to the engine carrier 26. When a hydraulic drive unit 66, shown in FIGS. 6–8, is used, the hydraulic pump 68 and valving are also carried on the engine carrier 26 thereby minimizing the time required for removal of the entire drive train as previously discussed. The power plant 22 operates in a normal fashion, creating mechanical energy that is transferred by a crankshaft (not shown). The crankshaft turns a spindle 70 on which a belt 71 is secured. The belt 71 is preferably a three inch open primary belt that in turn powers the hydraulic pump 68. Generally, it is preferred to power the pump 68 in a manner so that the pump 68 revolves once for every two revolutions of the engine crankshaft. The hydraulic pump 68 may be of any variety known in the market, so long as it is capable of generating pressures of up to or exceeding 3500 psi.

The hydraulic pump 68 pressurizes fluid that is sumped from a fluid reservoir. Preferably, the fluid reservoir is contained in the lower portion 34 of the backbone 30. The fluid reservoir is accessed in the lower portion 34 of the backbone 30 by a hydraulic coupling 72. From the fluid reservoir, the hydraulic fluid passes through hydraulic lines 74 into a variable valve 76. The variable valve 76 is connected to two hydraulic lines 74 that communicate with opposite sides of the hydraulic pump 68. In this manner, the variable valve 76 allows a rider to select forward or reverse in a variety of speeds.

If the rider selects forward, the hydraulic fluid is pressurized by the hydraulic pump and sent to the hydraulic motor 78 via additional hydraulic lines 74. The hydraulic motor 78 may be a vane style hydraulic motor or a gear style, piston style, swath style or any other suitable type of hydraulic motor. In a gear style hydraulic motor, fluid enters the motor and turns a gear case that steps up the speed of the hydraulic motor. In this manner, power can be applied to the rear wheel 80 to operate the motorcycle 20 at any speed including highway speeds. Alternatively, the hydraulic drive unit 66 may also provide power assistance to the front wheel 40 or to both wheels 40, 80.

After the fluid has transferred power from the hydraulic pump to the hydraulic motor 78, the fluid returns to the fluid reservoir in the lower portion 34 of the backbone 30. Preferably, the fluid returns to the upper portion 32 of the backbone 30 and travels down the backbone 30 and into the fluid reservoir. The air circulating over the backbone 30 from the travel of the motorcycle 20 cools the returning fluid and thereby the backbone acts as a radiator for the hydraulic fluid.

The hydraulic fluid is routed from the hydraulic motor 78 to the backbone 30 by hydraulic lines 74. The hydraulic fluid also flows back through the variable valve 76. Additionally, a braking valve (not shown) may be installed in the return stream. The braking valve can be opened and closed to act as a parking brake or auxiliary braking system. Auxiliary braking may be necessary when the motorcycle 20 is towing a trailer. When the braking valve is closed, the fluid cannot flow back to the fluid reservoir or back to the variable valve, thus preventing the hydraulic motor 78 from turning the rear wheel 80. Similarly, reducing the pressure in the hydraulic lines 74 will cause the hydraulic motor 78 to slow and thereby brake the rear wheel 80 of the motorcycle 20. Pressure can be reduced by slowing the power plant 22 or reducing the flow of fluid by adjusting the variable valve 76 or the braking valve (not shown).

Variable valve 76 includes a built in pressure regulator. Thus the variable valve 76 protects the hydraulic lines and seals used in the hydraulic drive unit 66 by releasing or dumping hydraulic fluid back into the reservoir should the hydraulic pressure exceed a desired limit. This limit can be set to meet or exceed the pressure limitations of all hydraulic lines, valves, or seals used in the hydraulic drive unit 66. Preferably, the pressure is limited to 2000–2500 psi. Thus, it can be seen that the hydraulic drive unit 66 of the present invention contains means to both apply power to and brake the rear wheel 80.

Alternatively, the drive unit of the present invention may be a hydrostatic drive unit (not shown). A hydrostatic drive unit is typically sealed without any power components inside. A hydrostatic unit would not require the fluid reservoir and may come in a more compact form that converts mechanical energy directly from the engine to the rear wheel. The hydraulic or hydrostatic drive unit 66 of the present invention may be used with any style of frame, including the stock frames currently available and the frame 24 previously described. Further, the frame 24 may also be used in conjunction with a chain and clutch style drive unit that is common in motorcycles today.

The drive unit 66 or any other selected drive unit is preferably contained in a swing arm 86 as shown in FIGS. 3 and 8. The front portion of the swing arm 86 is rotatably secured to the suspension mounts 62 by bolts or through any known means. The hydraulic motor 78 is attached to the swing arm and connects the swing arm 86 to the rear wheel 80. The swing arm 86 acts as a housing for the hydraulic motor and all hydraulic lines 74 running to and from the hydraulic motor 78. The swing arm 86 is preferably constructed of stainless steel or aluminum, but a variety of suitable materials may be used.

Because the hydraulic drive unit 66 of the present invention serves both driving and braking functions, there is no need for a supplemental brake pad and shoe style system. This allows the rear wheel 80 to be attached to the drive unit without any obstructions on one side of the rear wheel 80, minimizing the time necessary for removal of the rear wheel 80.

Whereas the invention has been shown and described in connection with the preferred embodiments thereof, it will be understood that many modifications, substitutions, and additions may be made which are within the intended broad scope of the following claims.

What is claimed is:

1. A new frame for a motorcycle, the frame comprising:
a backbone having a lower portion and an upper portion;
a base support secured to the lower portion of the backbone;
a suspension support secured to the lower portion of the backbone, the suspension support adapted to receive a rear wheel;

an engine carrier secured to the lower portion of the backbone wherein the engine carrier is free from a connection to the upper portion of the backbone;

at least one engine mount having an axial end secured to the lower portion of the backbone by being attached to the base support and a proximal end extending underneath the backbone; and at least one upper support with a first end secured to the engine mount proximal end and a second end secured to the backbone away from the upper portion.

2. The frame of claim 1 wherein the engine carrier is removably secured to the backbone.

3. The frame of claim 1 further comprising a power plant secured between the backbone and the engine carrier.

4. The frame of claim 1 further comprising a swing arm secured to the suspension support.

5. The engine carrier of claim 1 wherein the upper support second end is secured to the backbone by at least one load transfer bar.

6. The suspension support of claim 5 comprising at least one vertically oriented suspension mount.

7. The suspension system of claim 1 further comprising load transfer bars with an axial end attached to the suspension support and a proximal end attached to the backbone.

8. The suspension system of claim 7 wherein the load transfer bars are adapted to apply forces resulting from the rear weight of the motorcycle to the backbone in an opposite direction to a load generated by the engine carrier to eliminate the need for front support bars.

9. The motorcycle of claim 1 further comprising:
a power plant; and
a hydraulic drive unit that transfers power from the power plant to the rear wheel.

10. The motorcycle of claim 9 wherein the hydraulic drive unit includes a hydraulic motor operatively connected to a hydraulic pump.

11. The motorcycle of claim 10 wherein the hydraulic pump is secured to the engine carrier.

12. The motorcycle of claim 10 wherein the hydraulic motor is secured to a swing arm.

13. A hydraulically driven motorcycle including a front wheel and a rear wheel, the motorcycle comprising;
a frame;
a power plant secured to the frame;
a hydraulic pump operatively connected to the power plant;
a hydraulic motor operatively connected to the rear wheel, the hydraulic motor being operatively connected to the hydraulic pump by one or more hydraulic lines;
a hydraulic reservoir operatively connected to the hydraulic pump and hydraulic motor to provide and receive hydraulic fluid;

a variable valve operatively connected to the hydraulic reservoir and hydraulic pump; and
a pressure regulator within the variable valve to protect the hydraulic lines by releasing hydraulic fluid back into the hydraulic reservoir.

14. The motorcycle of claim 13 further comprising a braking valve.

15. The motorcycle of claim 13 further comprising a suspension system connected to the frame and the rear wheel.

16. The motorcycle of claim 15 wherein the suspension system can be lowered to rest the frame on the ground.

17. The motorcycle of claim 13 wherein the hydraulic reservoir is in the frame such that air circulating over the backbone cools hydraulic fluids.

18. The motorcycle of claim 13 wherein the rear wheel is removable without the need for removing a braking system.

19. A new frame for a motorcycle, the frame comprising:
a backbone having a lower portion and an upper portion;
a base support secured to the lower portion of the backbone;
a suspension support secured to the lower portion of the backbone, the suspension support adapted to receive a rear wheel;
an engine carrier secured to the lower portion of the backbone wherein the engine carrier is free from a connection to the upper portion of the backbone;
a pair of engine mounts having an axial end secured to the lower portion of the backbone by being attached to the base support and a proximal end extending underneath the backbone;
a tie bar connecting the engine mounts proximal ends together;
at least one light attached to the tie bar.

20. A new frame for a motorcycle, the frame comprising:
a backbone having a lower portion and an upper portion;
a base support secured to the lower portion of the backbone;
a suspension support secured to the lower portion of the backbone, the suspension support adapted to receive a rear wheel;
an engine carrier secured to the lower portion of the backbone;
wherein the suspension support permits the frame to be raised during operation and lowered during parking to eliminate the need for a kick stand.

* * * * *